US012809836B2

(12) United States Patent
Wang et al.

(10) Patent No.: US 12,809,836 B2
(45) Date of Patent: Nov. 24, 2026

(54) ACCOUNT CREATION METHOD, INTERNET OF THINGS MULTI-TENANT SYSTEM, DEVICE, PROGRAM, AND MEDIUM

(71) Applicant: BOE Technology Group Co., Ltd., Beijing (CN)

(72) Inventors: Huailiang Wang, Beijing (CN); Tao Li, Beijing (CN); Hongjun Du, Beijing (CN); Hongda Yu, Beijing (CN); Haitao Zheng, Beijing (CN); Shiye Li, Beijing (CN); Gao Ji, Beijing (CN); Guoqi Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 186 days.

(21) Appl. No.: 18/703,019

(22) PCT Filed: Apr. 28, 2023

(86) PCT No.: PCT/CN2023/091803
§ 371 (c)(1),
(2) Date: Jul. 11, 2025

(87) PCT Pub. No.: WO2023/231681
PCT Pub. Date: Dec. 7, 2023

(65) Prior Publication Data

US 2025/0348472 A1 Nov. 13, 2025

(30) Foreign Application Priority Data

May 31, 2022 (CN) ......................... 202210607840.9

(51) Int. Cl.
*G06F 16/00* (2019.01)
*G06F 16/22* (2019.01)
(Continued)

(52) U.S. Cl.
CPC .............. *G06F 16/22* (2019.01); *H04L 67/12* (2013.01); *H04L 67/306* (2013.01)

(58) Field of Classification Search
None
See application file for complete search history.

(56) References Cited

U.S. PATENT DOCUMENTS 9,591,016 B1 * 3/2017 Palmieri ............. H04L 63/1433
2015/0130630 A1 * 5/2015 Outwater ............... G06Q 30/06
340/870.02

(Continued)

FOREIGN PATENT DOCUMENTS

CN 106529331 A * 3/2017 ......... G06F 21/6218
CN 107203575 A 9/2017

(Continued)

OTHER PUBLICATIONS

Office Action dated Mar. 27, 2025, issued in counterpart CN Application No. 202210607840.9, with English translation. (25 pages).

*Primary Examiner* — Hasanul Mobin
(74) *Attorney, Agent, or Firm* — WHDA, LLP

(57) ABSTRACT

An account creation method, an Internet of Things multi-tenant system, a device, a program, and a medium provided by the present invention relate to the technical field of Internet of Things, and are applied to an Internet of Things multi-tenant platform. The method comprises: receiving an account creation request that at least comprises: an account identifier and a database instance identifier; creating, in a database server according to a database instance corresponding to the database instance identifier, a target tenant database corresponding to the account identifier, wherein the database instance is a database instance corresponding to existing tenant databases in the database server; and after the completion of the creation of the target tenant database,
(Continued)

inputting an account creation success notification corresponding to the account identifier.

11 Claims, 11 Drawing Sheets

(51) Int. Cl.
*H04L 67/12* (2022.01)
*H04L 67/306* (2022.01)

(56) References Cited

U.S. PATENT DOCUMENTS

| | | | | |
|---|---|---|---|---|
| 2018/0307509 | A1* | 10/2018 | Dai | G06F 9/5027 |
| 2019/0045207 | A1* | 2/2019 | Chen | G06F 21/44 |
| 2019/0149342 | A1* | 5/2019 | Fynaardt | H04L 9/0891 713/156 |
| 2019/0260762 | A1* | 8/2019 | Fynaardt | H04W 12/06 |
| 2020/0104309 | A1* | 4/2020 | Borges | G06F 16/2372 |
| 2022/0180579 | A1* | 6/2022 | Bharti | G06F 40/30 |
| 2022/0292584 | A1* | 9/2022 | Kumar | H04L 9/3213 |
| 2023/0113260 | A1* | 4/2023 | Saxena | H02J 3/14 700/295 |

FOREIGN PATENT DOCUMENTS

| | | | | |
|---|---|---|---|---|
| CN | 110163002 | A | 8/2019 | |
| CN | 112100262 | A | * 12/2020 | G06F 8/60 |
| CN | 112732441 | A | 4/2021 | |
| CN | 113515499 | A | 10/2021 | |
| CN | 114417300 | A | 4/2022 | |
| CN | 114969045 | A | 8/2022 | |

* cited by examiner

ACCOUNT CREATION METHOD, INTERNET OF THINGS MULTI-TENANT SYSTEM, DEVICE, PROGRAM, AND MEDIUM

CROSS REFERENCE TO RELATED APPLICATIONS

The disclosure claims the priority of the Chinese patent application No. 202210607840.9, filed with the China National Intellectual Property Administration on May 31, 2022, titled "ACCOUNT CREATION METHOD, INTERNET OF THINGS MULTI-TENANT SYSTEM, DEVICE. PROGRAM, AND MEDIUM", the entire contents of which are incorporated herein by reference.

TECHNICAL FIELD

The disclosure belongs to the technical field of Internet of Things, in particular relates to an account creation method, an Internet of Things multi-tenant system, a device, a program, and a medium.

BACKGROUND

In recent years, with the rapid development of Internet of Things, the maturity of an Internet of Things software and hardware development technology, and the growth of user demands on the Internet of Things platform, software-as-a-service technology has gradually developed and matured, which can provide various Internet of Things services for a plurality of different tenants in a housing rental scenario through an Internet of Things system.

However, since tenant-related information is usually stored in static files in a multi-tenant database, adding configuration information during data configuration will result in a service restart problem.

SUMMARY

The disclosure provides an account creation method, an Internet of Things multi-tenant system, a device, a program, and a medium.

Some embodiments of the disclosure provide an account creation method applied to an Internet of Things multi-tenant platform, and the method includes:

- receiving an account creation request which at least includes an account identification and a database instance identification;
- creating a target tenant database corresponding to the account identification in a database server based on a database instance corresponding to the database instance identification, wherein the database instance is a database instance corresponding to an existing tenant database in the database server, and
- outputting an account creation success notification corresponding to the account identification after creating the target tenant database.

Optionally, the account creation request further includes a business identification associated with the account identification;

- the outputting the account creation success notification corresponding to the account identification includes:
- sending the account creation success notification corresponding to the account identification to a business server corresponding to the business identification; and
- after the outputting the account creation success notification corresponding to the account identification, the method further includes:
- receiving a data source identification sent by the business server based on the account creation success notification; and
- establishing a mapping relationship between a data source corresponding to the data source identification and the account identification, wherein the data source is configured to provide business service data to an account.

Optionally, after the establishing the mapping relationship between the data source corresponding to the data source identification and the account identification, the method further includes:

- establishing a connection pool between the target tenant database and the data source.

Optionally, after the establishing the connection pool between the target tenant database and the data source, the method further includes:

- acquiring an operation parameter of the connection pool;
- adjusting a configuration parameter of the connection pool based on the operation parameter of the connection pool; and
- sending a connection pool adjustment notification carrying the configuration parameter of the connection pool to the business server;
- wherein the connection pool adjustment notification is configured to instruct the business server to perform at least one of the following parameter configurations of the connection pool;
- when a number of connections is greater than a maximum number of connections, releasing a number of connections in excess of the maximum number of connections;
- when a number of idle connections is greater than the maximum number of idle connections, releasing a number of idle connections in excess of the maximum number of idle connections; and
- when the number of idle connections is smaller than the minimum number of idle connections, creating a number of connections below the minimum number of idle connections.

Optionally, after the receiving the account creation request, the method further includes:

- storing the account identification and the database instance identification in association in a primary database which is configured to store account-related tenant information.

Optionally, after the creating the target tenant database corresponding to the account identification in the database server based on the database instance corresponding to the database instance identification, the method further includes:

- creating a business table corresponding to the account identification in the target tenant database; and
- initializing business information and permission information in the business table;
- wherein the business table is configured to record user information corresponding to the account identification and is queried by an object described by the permission information.

Optionally, the method further includes:

- receiving a service registration request sent by an account, wherein the service registration request at least includes a business identification and an account identification;
- generating an account key and a business key corresponding to the account identification; and
- sending the account key and the business key to a business server corresponding to the business identification to complete a service registration process for the account, wherein the account key and the business key are configured to verify an identity of the account.

Some embodiments of the disclosure provide an Internet of Things multi-tenant system, including an Internet of Things device, a business server and a database server;

wherein the Internet of Things device is configured to send an account creation request to the database server in response to user input, wherein the account creation request includes an account identification, a database instance identification and a business identification;

the database server is configured to create a target tenant database corresponding to the account identification in the database server based on a database instance corresponding to the database instance identification, and send a database creation success notification corresponding to the account identification to the Internet of Things device and the business server after creating the target tenant database, wherein the database instance is a database instance corresponding to an existing tenant database in the database server;

the business server is configured to create a data source corresponding to the account identification based on the database creation success notification, and send a data source identification of the data source to the Internet of Things device; and the Internet of Things device is configured to establish a mapping relationship between the data source corresponding to the data source identification and the account identification, so as to establish a connection pool between the target tenant database and the data source.

Optionally, the Internet of Things device is further configured to acquire an operation parameter of the connection pool and send a connection pool adjustment notification carrying the configuration parameter of the connection pool to the business server, and the business server performs at least one of the following parameter configurations of the connection pool:

when a number of connections is greater than a maximum number of connections, releasing a number of connections in excess of the maximum number of connections;

when a number of idle connections is greater than the maximum number of idle connections, releasing a number of idle connections in excess of the maximum number of idle connections; and when the number of idle connections is smaller than the minimum number of idle connections, creating a number of connections below the minimum number of idle connections.

Optionally, the Internet of Things device is further configured to generate an account key and a business key corresponding to the account identification, and send the account key and the business key to the business server corresponding to the business identification to complete a service registration process for the account, and the account key and the business key are configured to verify an identity of the account; and the business server is further configured to store the account key and the business key in association.

Optionally, the Internet of Things device is further configured to generate a first account signature based on the account key and the business key in response to user input, and send a service acquisition request carrying the account key and the first account signature to the business server; and the business server is further configured to query for the business key associated with the account key, and generate a second account signature based on the business key and the account key, and send business service information to the Internet of Things device when the first account signature and the second account signature are successfully compared.

Optionally, the Internet of Things device is further configured to send an account verification request carrying the account identification to the business server in response to a received device information query operation:

the business server is further configured to query the database server for account information corresponding to the account identification in response to an account verification request, and send an authentication pass message for the account identification to the Internet of Things device after verification for the account information passes; and the Internet of Things device is further configured to acquire device information matching an account permission of the account identification from the database server in response to the authentication pass message, and display the device information.

Some embodiments of the disclosure provide an account creation apparatus applied to an Internet of Things multi-tenant platform, and the apparatus includes:

a tenant management module configured to receive an account creation request, where the account creation request at least includes an account identification and a database instance identification;

a data isolation module configured to create a target tenant database corresponding to the account identification in a database server based on the database instance corresponding to the database instance identification, where the database instance is a database instance corresponding to an existing tenant database in the database server;

the tenant management module is further configured to output an account creation success notification corresponding to the account identification after creating the target tenant database.

Optionally, the account creation request further includes a business identification associated with the account identification;

the data isolation module is further configured to send the account creation success notification corresponding to the account identification to a business server corresponding to the business identification;

receive a data source identification sent by the business server based on the account creation success notification;

establish a mapping relationship between a data source corresponding to the data source identification and the account identification, where the data source is configured to provide business service data to an account.

Optionally, the data isolation module is also configured to:

establish a connection pool between the target tenant database and the data source.

Optionally, the apparatus further includes a monitoring operation and maintenance module configured to:

acquire an operation parameter of the connection pool;

adjust a configuration parameter of the connection pool based on the operation parameter of the connection pool; and send a connection pool adjustment notification carrying the configuration parameter of the connection pool to the business server;

where the connection pool adjustment notification is configured to instruct the business server to perform at least one of the following parameter configurations of the connection pool;

when a number of connections is greater than a maximum number of connections, releasing a number of connections in excess of the maximum number of connections;

when a number of idle connections is greater than the maximum number of idle connections, releasing a number of idle connections in excess of the maximum number of idle connections; and when the number of idle connections is smaller than the minimum number of idle connections, creating a number of connections below the minimum number of idle connections.

Optionally, the tenant management module is further configured to:

store the account identification and the database instance identification in association in a primary database which is configured to store account-related tenant information.

Optionally, the data isolation module is also configured to:

create a business table corresponding to the account identification in the target tenant database; and initialize business information and permission information in the business table;

where the business table is configured to record user information corresponding to the account identification and is queried by an object described by the permission information.

Optionally, the apparatus further includes an application management module configured to:

receive a service registration request sent by an account, wherein the service registration request at least includes a business identification and an account identification;

generate an account key and a business key corresponding to the account identification; and send the account key and the business key to a business server corresponding to the business identification to complete a service registration process for the account, wherein the account key and the business key are configured to verify an identity of the account.

Optionally, the apparatus further includes:

an authentication center module configured to perform permission verification on tenant information, user information and application information in the Internet of Things multi-tenant platform.

Some embodiments of the present disclosure provide a computer processing device including:

a memory in which computer readable code is stored;

one or more processors which, when executing the computer readable code, causes the computer processing device to perform the above account creation method.

Some embodiments of the present disclosure provide a computer program including computer-readable code which, when run on a computer processing device, causes the computer processing device to perform the above account creation method.

Some embodiments of the present disclosure provide a non-transitory computer-readable medium in which the above account creation method is stored.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to describe the technical solutions in embodiments of the disclosure or the prior art more clearly, the accompanying drawings required for describing the embodiments or the prior art will be briefly introduced below. Apparently, the accompanying drawings in the following description show only some embodiments of the disclosure, and those of ordinary skill in the art may still derive other accompanying drawings from these accompanying drawings without creative efforts.

DETAILED DESCRIPTION OF THE EMBODIMENTS

In order to make the objects, technical solutions and advantages of the embodiments of the disclosure clearer, the technical solutions in the embodiments of the disclosure will be described clearly and completely below in conjunction with the accompanying drawings in the embodiments of the disclosure. Apparently, the described embodiments are only a part of the embodiments of the disclosure, but not all of the embodiments. Based on the embodiments of the disclosure, all other embodiments obtained by those of ordinary skill in the art without creative efforts shall fall within the protection scope of the disclosure.

Figure 1:
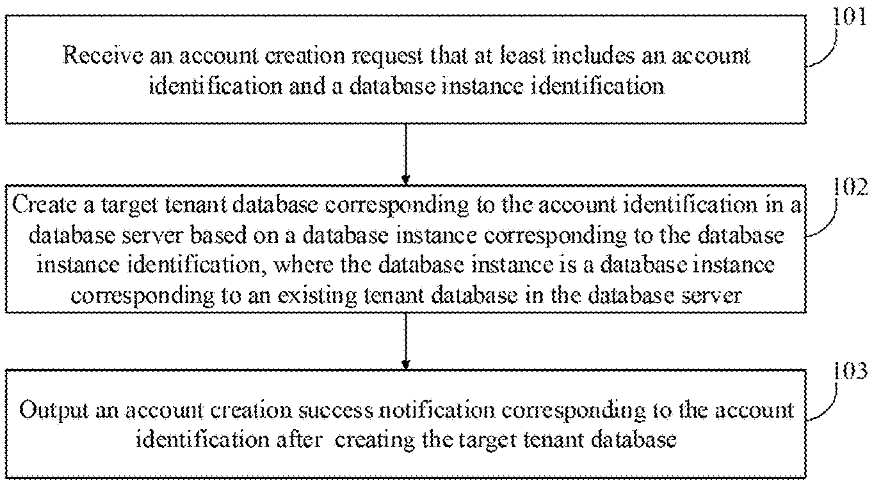
FIG. 1 schematically shows a schematic flow diagram of an account creation method provided in some embodiments of the disclosure.

FIG. 1 schematically shows a schematic flow diagram of an account creation method provided in the disclosure. The account creation method is applied to an Internet of Things multi-tenant platform, and includes steps 101-105.

In step 101, an account creation request is received, and the account creation request at least includes an account identification and a database instance identification.

It should be noted that the execution subject in the disclosure is an Internet of Things device, which may be a non-directly connected device without Internet Protocol (IP) capacities. A multi-tenant device may be integrated into a gateway to access a Software Development Kit (SDK), and a terminal device of a tenant may be connected to the gateway as a sub-device, and rapidly access an Internet of Things platform through the gateway. The gateway may perform data forwarding between the terminal device and the platform. Of course, the Internet of Things device may also be a hardware device with stronger computation and storage capacities and IP capacities. The multi-tenant device is directly integrated into the device to access the SDK, and rapidly access the Internet of Things platform through a transport protocol such as Hyper Text Transfer Protocol over Secure Socket Layer (HTTPS), Message Queuing Telemetry Transport (MQTTS), or Constrained Application Protocol (COAP). The device is equipped with an intelligent system.

A database server is configured for providing a tenant data source for the Internet of Things device. Setting the data source for the terminal device in the database is beneficial to unified management of user data of tenants, and provides a basis for isolating and sharing user data according to a permission. Centralized management of data sources can also ensure the security of user data.

It should be noted that the database instance type includes, but are not limited to an exclusive database type and a shared database type. The exclusive database type represents a type of a database used by a single tenant alone, and the shared database type represents a type of a database used by a plurality of tenants together, which can be set according to actual demands, and is not limited herein. The account identification is a unique identification for identifying the user, which may be composed of an account name and a user identification. The account name may be set by the user, which may be a full name or nickname of the user. The user identification is a unique identification generated for the tenant by the system. Therefore, the account identification composed of the account name and the user identification can be used by the user to identify the user based on the account name, and can used by the system to identify the user base on the user identification.

In the embodiments of the disclosure, when an account of a tenant is created, a system administrator can log in the Internet of Things multi-tenant platform to access the Internet of Things device through the terminal device used by the system administrator, and after logging in, the system administrator may query for tenant information by viewing a tenant management list, which may include an account identification, a database instance type, list creation time, modification time, and query and modification operation controls, etc.

In Step 102, a target tenant database corresponding to the account identification is created in a database server based on a database instance corresponding to the database instance identification, where the database instance is a database instance corresponding to an existing tenant database in the database server.

It should be noted that the database instance is a database configuration parameter required for building a database. The system administrator may query for database instance information such as a database instance ID and a database instance name of a corresponding database instance by selecting a required database instance identification. It should be noted that the source of the database instance in the disclosure is the existing tenant database which has been historically built in the database server, i.e., a database instance corresponding to the existing tenant database. Thus, it is unnecessary to re-input the database instance into the database server and restart the server to configure the database instance for the target tenant database which is required to be built.

Further, database instance identifications of different existing tenant databases may be stored in the Internet of Things device for the system administrator to query and use, or stored in an external storage device connected to the Internet of Things device. Optionally, a database instance table including database instance-related information such as a database instance identification and database instance description information may be stored in a primary database of the database server for the system administrator to view and edit when creating an account by the Internet of Things device.

Figure 2:
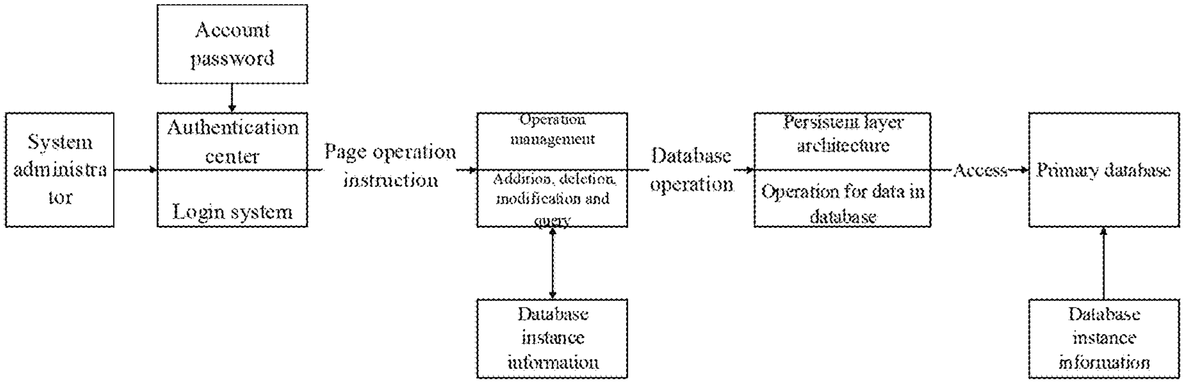
FIG. 2 schematically shows a first schematic logic diagram of another account creation method provided in some embodiments of the disclosure.

With reference to FIG. 2, the system administrator may access the multi-tenant management platform through a browser and enter a database instance editing request to perform operations such as adding, deleting, modifying and querying the database instance. Specifically, the system administrator may edit the database instance by inputting a database instance name, a database instance service address, a database instance port number, a database instance-related account and an account password for the database instance required to be edited. After verification for the database instance-related account and the account password passes, the Internet of Things device may edit the database instance based on the input database instance name, database instance service address and database instance port number. If the input database instance name does not exist, a database instance may be created based on the database instance name, the database instance service address and the database instance port number. If the input database instance name exists, the database instance may be directly edited.

In the embodiments of the disclosure, the Internet of Things device sends a database creation request carrying the database instance identification to a connected database server in response to a selection operation of the database instance identification by the system administrator, and the database server queries the database instance corresponding to the database instance identification, and creates the target tenant database corresponding to the account identification based on the queried database instance.

In step 103, after the target tenant database is created, an account creation success notification corresponding to the account identification is output.

In the embodiments of the disclosure, after creating the target tenant database, the database server sends the account creation success notification corresponding to the account identification to the Internet of Things device, the Internet of Things device displays the account creation success notification to notify the system administrator that the target tenant database corresponding to the account identification has been created, and tenant information and account information corresponding to the account identification can be stored in the target tenant database for use.

In the embodiments of the disclosure, a plurality of different types of database instances are preset for use in creating a database for an account when a user creates the account, which prevents the device from restarting when a configuration is newly added for data configuration in the static file storage database, improves the efficiency of account creation and reduce the cost of operation and maintenance.

Figure 3:
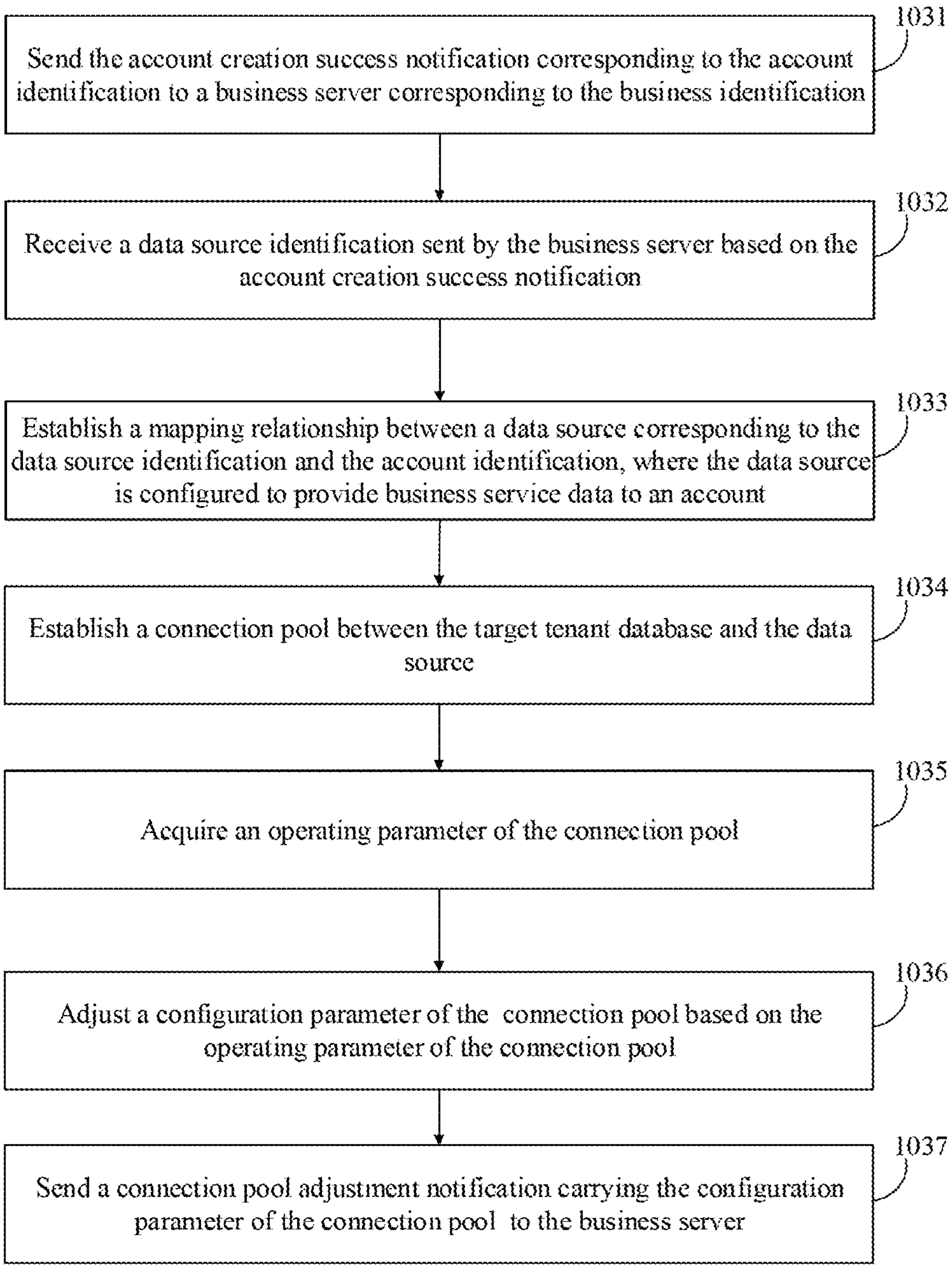
FIG. 3 schematically shows a first schematic flow diagram of another account creation method provided in some embodiments of the disclosure.

Optionally, the account creation request further includes an account identification-related business identification, and with reference to FIG. 3, the step 103 includes steps 1031-1037.

In step 1031, the account creation success notification corresponding to the account identification is sent to a business server corresponding to the business identification.

In the embodiments of the disclosure, the Internet of Things multi-tenant platform notifies other services in real time through event-driven message notifications after creating a database for a tenant.

In step 1032, a data source identification sent by the business server based on the account creation success notification is received.

In the embodiments of the disclosure, the business server, upon listening to an account creation success notification of the tenant, automatically creates a separate data source locally for the tenant corresponding to the account and sends the data source identification to the Internet of Things device.

In step 1033, a mapping relationship between the data source corresponding to the data source identification and the account identification is established, and the data source is configured to provide business service data to the account.

In the embodiments of the disclosure, the Internet of Things device is suitable for storing the data source corresponding to the data source identification provided by the business server and the account identification in association.

In step 1034, a connection pool between the target tenant database and the data source is established.

In the embodiments of the disclosure, the Internet of Things device interacts with the database server to establish the connection pool between the target tenant database corresponding to the account identification and the data source of the business server.

In step 1035, an operation parameter of the connection pool is acquired.

In step 1036, a configuration parameter of the connection pool is adjusted based on the operation parameter of the connection pool.

In step 1037, a connection pool adjustment notification carrying the configuration parameter of the connection pool is sent to the business server.

In the embodiments of the disclosure, after the separate connection pool corresponding to the account identification is established, the Internet of Things device may monitor usage of the connection pool in real time through a gateway to obtain the operation parameter of the connection pool, and adjust the configuration parameter of the connection pool based on the preset dynamic adjustment strategy of the connection pool. Specifically, the Internet of Things device may calculate the adjusted configuration parameter of the connection pool based on the dynamic adjustment strategy of the connection pool, and interact with the business server to adjust the configuration parameter of the connection pool, such as a number of connections, a maximum number of connections and a minimum number of connections.

In the embodiments of the disclosure, based on the Internet of Things technology scenario, a micro service architecture is adopted to support dynamic creation of the data source through multi-service coordination in a distributed deployment environment. After the tenant service creates the database for the tenant, it notifies other services in real time through an event-driven message notification. Other services create the data source for the tenant after receiving the notification. After initialization of the data source is completed, data query service may be instantly provided for the tenant, which improves the flexibility of a multi-tenant Internet of Things system.

The connection pool adjustment notification is configured to instruct the business server to perform at least one of following parameter configurations of the connection pool:

- when the number of connections is greater than the maximum number of connections, a number of connections in excess of the maximum number of connections are released;
- when the number of idle connections is greater than the maximum number of idle connections, a number of idle connections in excess of the maximum number of idle connections are released; and
- when the number of idle connections is less than the minimum number of idle connections, a number of connections below the minimum number of idle connections are created.

Optionally, the connection pool adjustment notification is configured to instruct the business server to perform at least one of following parameter configurations of the connection pool:

- parameter configuration 1 of the connection pool: when the number of connections is greater than the maximum number of connections, a number of connections in excess of the maximum number of connections are released;
- parameter configuration 2 of the connection pool: when the number of idle connections is greater than the maximum number of idle connections, a number of idle connections in excess of the maximum number of idle connections are released; and
- parameter configurations 3 of the connection pool: when the number of idle connections is smaller than the minimum number of idle connections, a number of connections below the minimum number of idle connections are created.

In the embodiments of the disclosure, for configuration 1, connection data can be adjusted based on the load of a gateway device, that is, when the load is too high, the number of connections in the connection pool can be appropriately reduced, otherwise, when the load is lower, the number of connections in the connection pool can be increased. The maximum number of connections is calculated as the maximum number of connections=Queries-Per-Second (QPS)/a number of instance nodes on the business server*80%. For configuration 2, even if there is no database connection, the number of idle connections can still be maintained without being cleared and will be in a standby state at any time, which is usually 20% of the maximum number of connections. For configuration 3, when the number of connections is smaller than the value, the connection pool will create connections to supplement the number of the value, and usually, 5% of the maximum number of the connections.

In the embodiments of the disclosure, in a multi-tenant mode of an Internet of Things platform in a distributed environment, parameters of the database connection pool are dynamically adjusted in real time by a plurality of servers (at a gateway layer, Request Per Second (RPS) equivalent to the QPS and average response time equivalent to the QPS of each tenant is calculated based on identified tenants), and the parameters (mainly including the maximum number of connections, the maximum number of idle connections and the minimum number of idle connections) of the connection pool of the tenant are dynamically adjusted. The gateway notifies other services of the calculated parameters of the connection pool of the database through messages, and other services adjust the parameters of the connection pool in real time based on the received parameters, which avoids resource waste caused by excessive allocation of connections and resource queuing and competition caused by insufficient allocation of connections.

Optionally, after step 101, the method further includes storing the account identification in associated with the database instance identification in a primary database, which is configured to store account-specific tenant information.

In the embodiments of the disclosure, the primary database is a database for storing tenant information in the database server, and the tenant information may include account information and permission information of the tenant, and configuration information of the tenant database, etc. Therefore, when a new account is created, it is necessary to store the received account identification and the database instance identification used in the built tenant database in the primary database for the system administrator to query and edit, so as to facilitate united editing of multiple tenants in the Internet of Things multi-tenant platform. Moreover, the database instance identification of the created tenant database can also be configured for subsequent account creation, which prevents the device from restarting when a configuration is newly added for data configuration in the static file storage database, improves the efficiency of account creation and reduce the cost of operation and maintenance.

Figure 4:
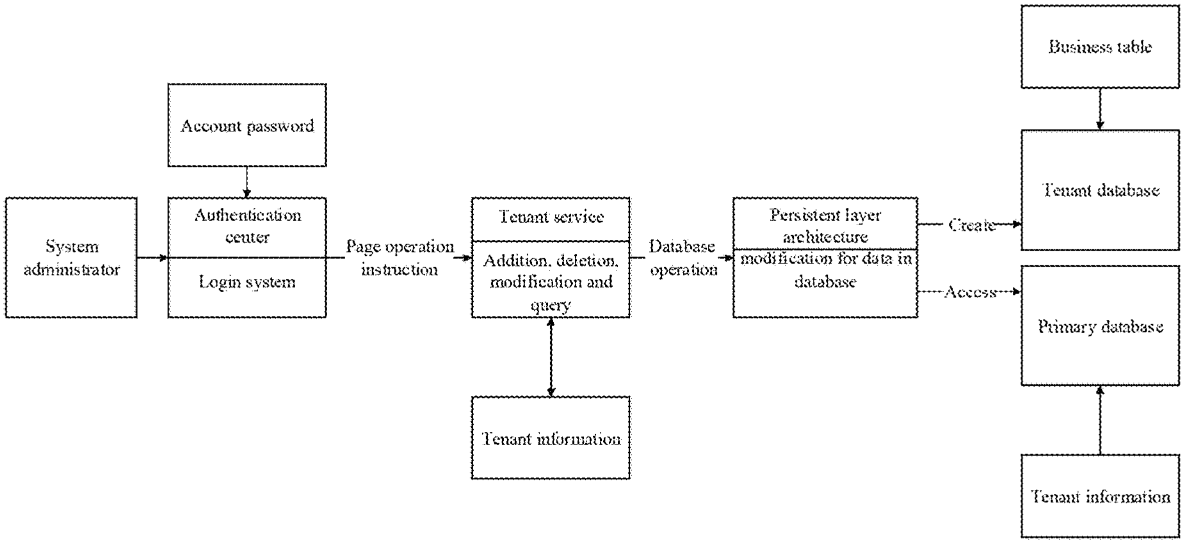
FIG. 4 schematically shows a second schematic logic diagram of another account creation method provided in some embodiments of the disclosure.

Optionally, the tenant information is managed by a process shown in FIG. 4.

After logging in to an authentication center through a user account, the system administrator can add, delete, modify and query the tenant information through a page operation instruction, and edit the tenant information stored in the primary database in the database server and business information stored in the tenant database through a database operation instruction.

Figure 5:
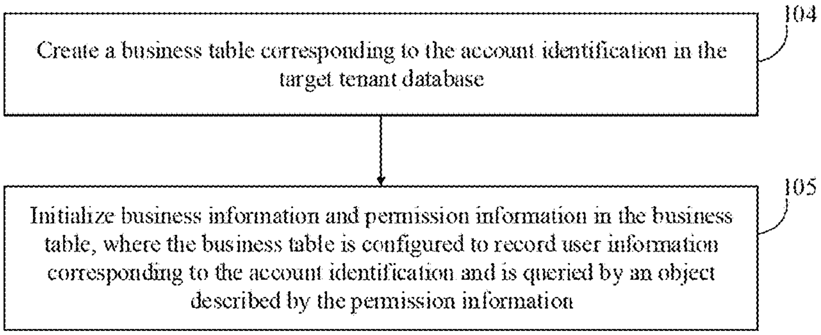
FIG. 5 schematically shows a second schematic flow diagram of another account creation method provided in some embodiments of the disclosure.

Optionally, with reference to FIG. 5, after the step 103, the method further includes steps 104-105.

In step 104, a business table corresponding to the account identification is created in the target tenant database.

In step 105, business information and permission information in the business table are initialized. The business table is configured to record user information corresponding to the account identification and is queried by an object described by the permission information.

In the embodiments of the disclosure, the business table is configured to store business information on service usage of the tenant corresponding to the account identification and permission information of the tenant. After the target tenant database corresponding to the account identification is created, the Internet of Things device can instruct the database server to create a corresponding business table in the target tenant database for the tenant, and initialize the business information and the permission information in the business table, so that the subsequent user stores service information and the subsequent permission information into the business table after using the business service. Moreover, contents in the business table can only be viewed by a tenant having a query permission, thereby ensuring data isolation between tenants and information security.

In the embodiments of the disclosure, the business table is dynamically created for the tenant through Object Relational Mapping (ORM) after the tenant database is created, which avoids lots of development work and error risks caused by manually parsing meta-data in the database and manually generating a Structured Query Language (SQL) script.

Figure 6:
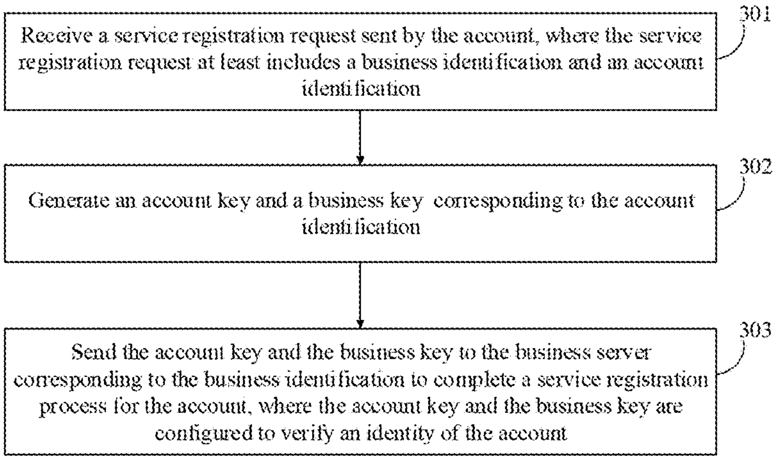
FIG. 6 schematically shows a third schematic flow diagram of another account creation method provided in some embodiments of the disclosure.

Optionally, with reference to FIG. 6, the method further includes steps 301-303.

In step 301, a service registration request sent by the account is received. The service registration request at least includes a business identification and an account identification.

In step 302, an account key and a business corresponding to the account identification are generated.

In step 303, the account key and the business key are sent to the business server corresponding to the business identification to complete a service registration process of the account. The account key and the business key are configured to verify an identity of the account.

In the embodiments of the disclosure, in view of the requirement of an Internet of Things multi-tenant system for storing a third-party business party access, if the application provided by the third-party business party is required to create an separate account for the tenant, and the tenant is required to verify different accounts several times when using the services provided by the third-party business party, which will result in unnecessary resource waste and greatly affect the efficiency of the tenant accesses to the third-party business services. Moreover, account sharing between the third-party business party and the Internet of Things multi-tenant system will also have a certain impact on the security of the system account.

Figure 7:
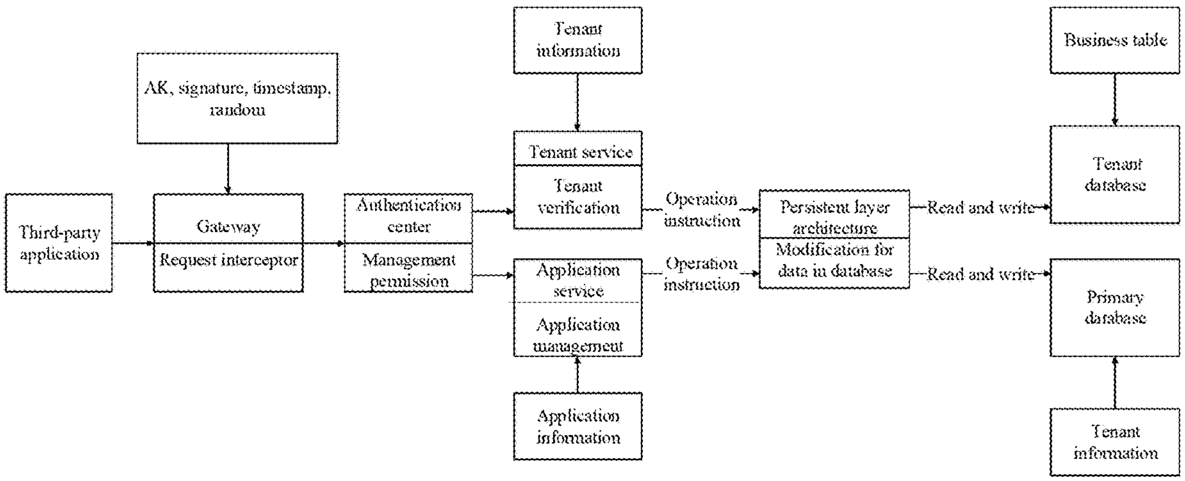
FIG. 7 schematically shows a third schematic logic diagram of another account creation method provided in some embodiments of the disclosure.

Therefore, with reference to FIG. 7, in the embodiments of the disclosure, after the account of the tenant is successfully created, if the tenant needs to use the business service of the third-party business party, the Internet of Things multi-tenant system automatically generates the account key and the business key corresponding to the business server for account verification based on the business identification and the account identification in the service registration request sent by the account.

Specifically, the Internet of Things platform generates the account key Access Key (AK) and the business key Secret Key (SK) for the tenant. The Access Key (AK) is automatically generated, globally unique, and associated with a tenant identification (32-bit UUID+ tenant domain), and cannot be modified. The Secret Key (SK) is automatically generated, globally unique, and cannot be modified. An identity of a sender for a request is verified by using an Access Key Id/Secret Access Key concatenation encryption method. The Access Key Id (AK) is configured to identify a user account, the Secret Access Key Secret Access Key is a secret key for a user to encrypt an authentication character string and for a cloud vendor to verify the authentication character string. Business keys corresponding to all the business servers are different, and the business key can be provided for the business party for verification, so it must be kept confidential. After the business server receives the request from the user, the system will generate the authentication character string by using the same SK corresponding to AK and the same authentication mechanism, and compare the authentication character string with an authentication character string included in the request from the user. If the authentication character strings are the same, the system considers that the user has a specified operation permission and performs the relevant operation. If the authentication character strings are different, the system will ignore the operation and return an error code.

Figure 8:
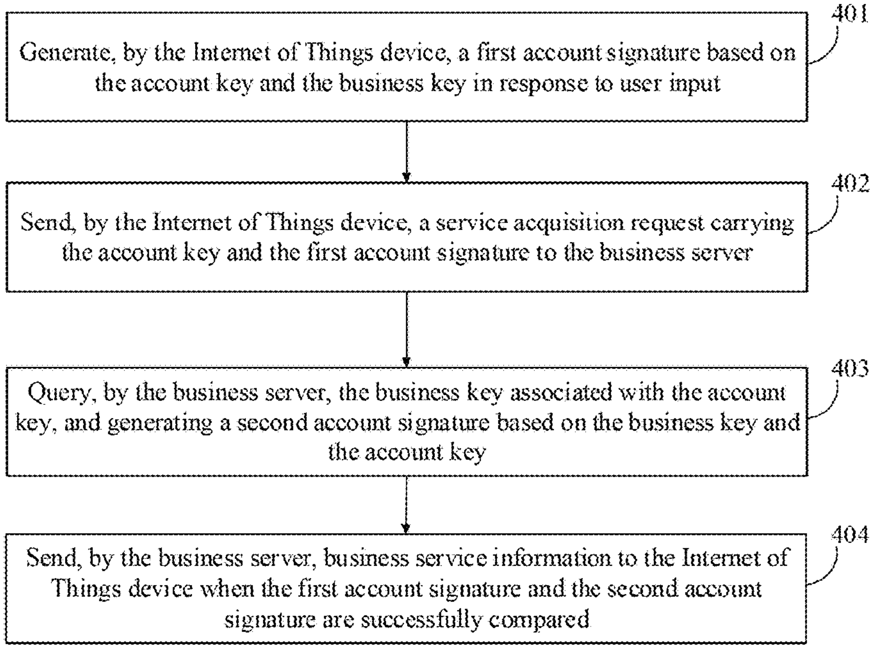
FIG. 8 schematically shows a fourth schematic flow diagram of another account creation method provided in some embodiments of the disclosure.

Optionally, with reference to FIG. 8, a verification process for the request sent by the business server to the Internet of Things device is as follows.

In step 401, the Internet of Things device generates a first account signature based on the account key and the business key in response to user input.

In step 402, the Internet of Things device sends a service acquisition request carrying the account key and the first account signature to the business server.

In step 403, the business server queries for the business key associated with the account key, and generate a second account signature based on the business key and the account key.

In step 404, the business server sends business service information to the Internet of Things device when the first account signature and the second account signature are successfully compared.

In the embodiments of the disclosure, when the Internet of Things device requests an Internet of Things Application Programming Interface (IoT API) (a functional interface for constructing the service acquisition request in the Internet of Things multi-tenant platform), a request header is constructed firstly, and then a request is initiated, and an appKey, a timestamp, a random and a signature are added in the request header, The appKey is AK, the timestamp is the current time, the random is a random number, the signature is generated from appKey+timestamp+random+SK by using an algorithm. After receiving the request, the business server performs authentication by using AK/SK. The business server acquires parameters of the appKey, the timestamp, the random and the signature from the request header firstly, then identifies the tenant is based on the sent appKey, and queries the database to obtain the corresponding secret_key.

The IoT calculates the signature from appKey+timestamp+random+SK by using the same algorithm. The signature sent by the user is compared with the signature calculated by the business server. If they are the same, the authentication passes, otherwise, the authentication fails.

In the disclosure, the business key and the account key are generated for the account, and the account of the tenant is verified by the external business server, so that the account of the tenant cannot be directly exposed to the business server, and the business server can also verify the account of the tenant to ensure the security of the account of the tenant.

Figure 9:
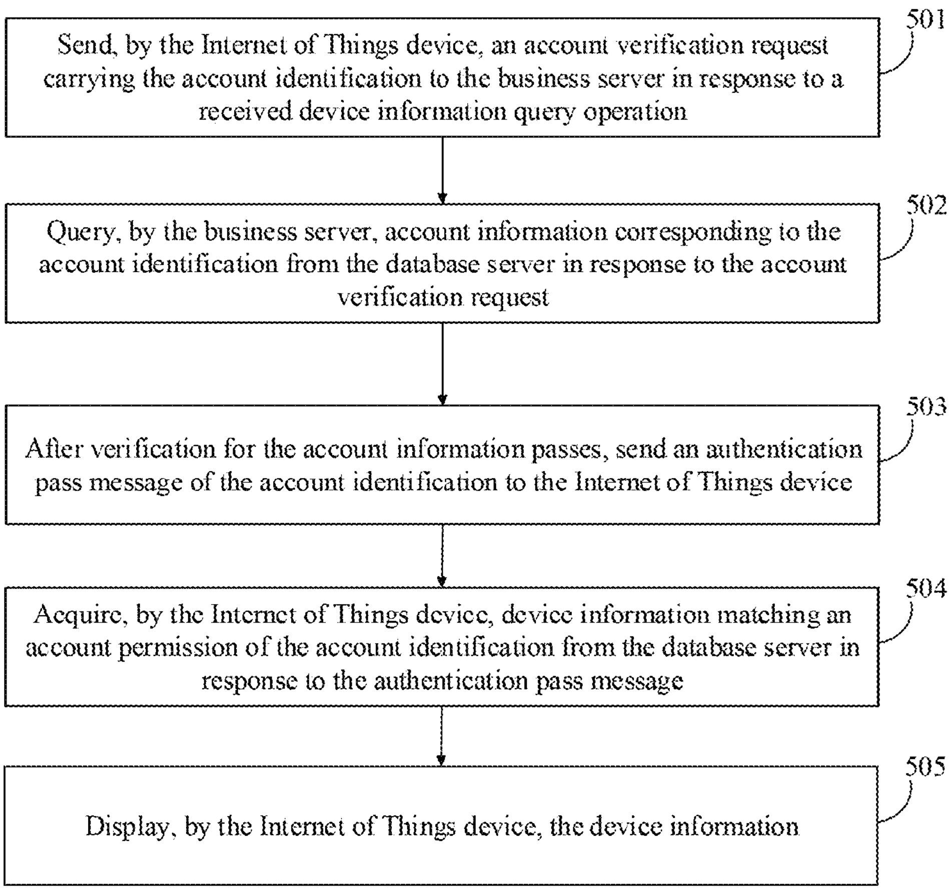
FIG. 9 schematically shows a fifth schematic flow diagram of another account creation method provided in some embodiments of the disclosure.

Optionally, with reference to FIG. 9, a process that the Internet of Things device queries for device information is as follows.

In step 501, the Internet of Things device sends an account verification request carrying the account identification to the business server in response to the received device information query operation.

In step 502, the business server queries for the account information corresponding to the account identification from the database server in response to the account verification request.

In step 503, after verification for the account information passes, the business server sends an authentication pass message of the account identification to the Internet of Things device, In step 504, the Internet of Things device obtains device information matching an account permission of the account identification from the database server in response to the authentication pass message.

In step 505, the Internet of Things device displays the device information.

Figure 10:
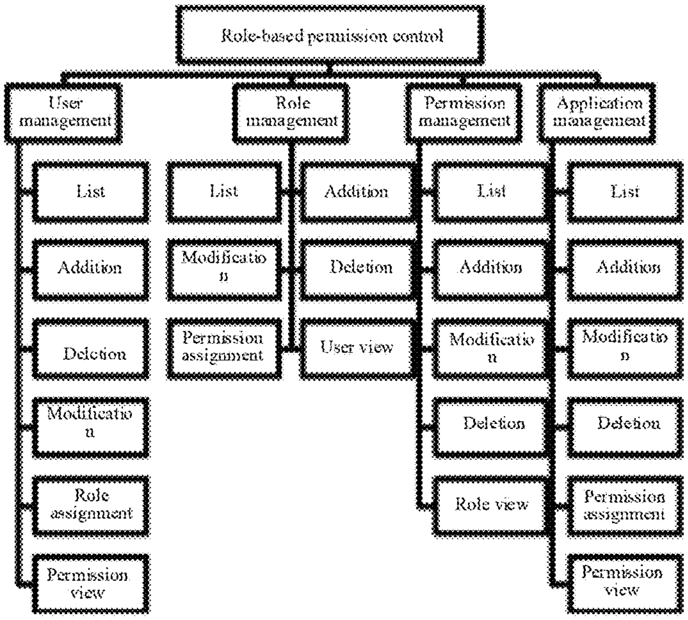
FIG. 10 schematically shows a schematic logic diagram of a permission management method provided in some embodiments of the disclosure.

In the embodiments of the disclosure, with reference to FIG. 10, the Internet of Things multi-tenant system for the tenant management is mainly divided into a user management module, a role management module, an authentication center module and an application management module for tenant management. The user management module may include functions of list query, tenant addition, deletion, modification, role assignment and permission viewing, etc. The role management module may include functions of role list query, addition, deletion, modification, role assignment permission and user role viewing, etc. The authentication center module may provide functions of permission list query, addition, modification, deletion and role viewing, etc. The application management module may provide functions of application list query, addition, deletion, modification, application permission assignment and application permission viewing, etc.

Figure 11:
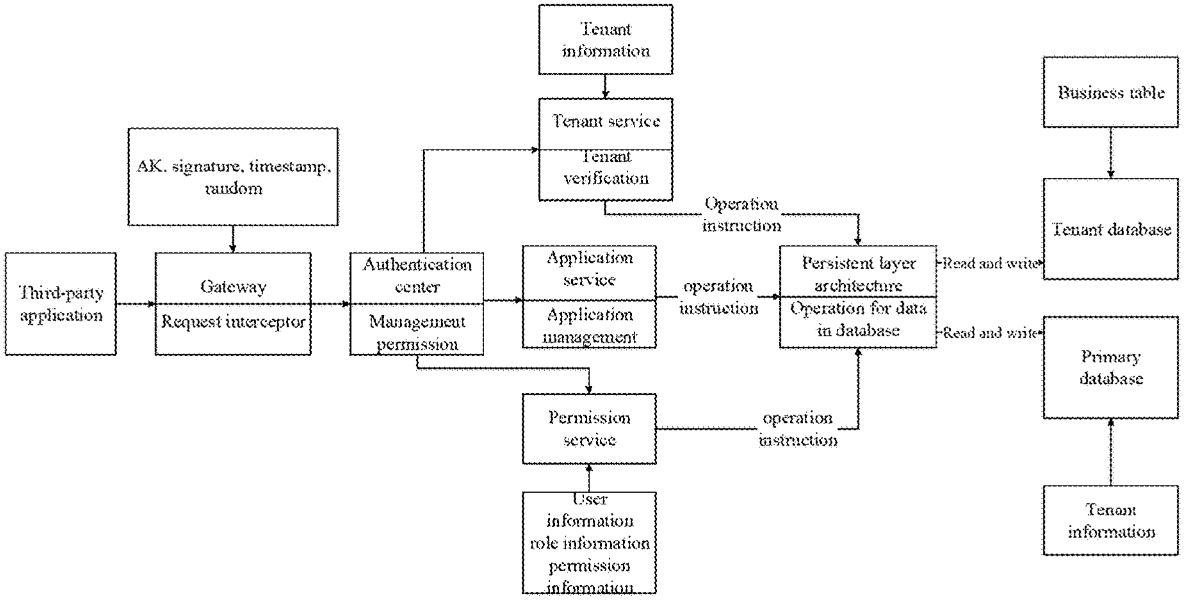
FIG. 11 schematically shows a fourth schematic logic diagram of another account creation method provided in some embodiments of the disclosure.

Optionally, with reference to FIG. 11, the authentication center is responsible for the security of the Internet of Things platform. It is mainly responsible for authenticating tenants, authenticating users and applications, authenticating user permissions and application permissions. The authentication center involves the interaction among a plurality of business servers, and the business servers pass tenant information through context. The main functions of the authentication center include: tenant authentication: verifying the legitimacy of tenants; user authentication: verifying the legitimacy of users based on the tenant routing to a tenant data source; user permission authentication: verifying the user permissions based on the tenant routing to the tenant data source; application authentication: verifying the legitimacy of the applications based on the tenant routing to the tenant data source; and application permission authentication: verifying the application permissions based on the tenant routing to the tenant data source.

Figure 12:
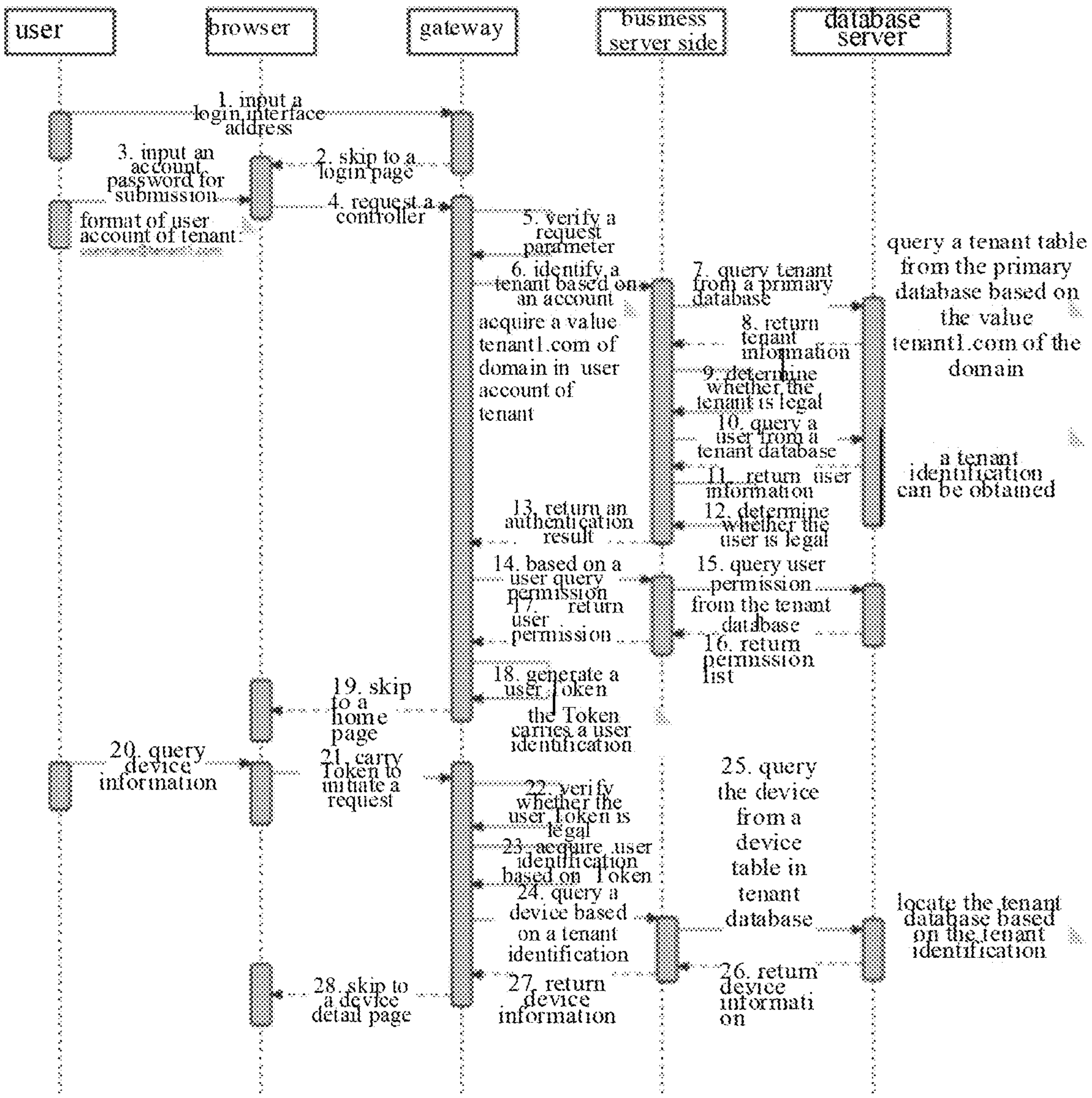
FIG. 12 schematically shows a schematic flow diagram of a device information query method provided in some embodiments of the disclosure.

Further, with reference to FIG. 12, a user may view the device information by the following steps.

In step 1, the user requests a gateway by inputting an address of a login page in a browser.

In step 2, the gateway sends a login page to the browser.

In step 3, the user inputs an account password in the login page.

In step 4, the browser requests a controller of the gateway based on the user input.

In step 5, the gateway verifies a request parameter.

In step 6, the gateway requests a business server to identify a tenant based on a user account.

In step 7, the business server queries for tenant information from a primary database server.

In step 8, the database server returns the tenant information to the business server.

In step 9, the business server verifies whether the tenant information is legal.

In step 10, after the verification for the tenant information passes, the business server requests the database server to obtain user information.

In step 11, the database server returns the user information to the business server.

In step 12, the business server verifies whether the user information is legal.

In step 13, the business server sends an authentication result to the gateway.

In step 14, the gateway requests the business server to obtain a permission list based on a user viewing permission.

In step 15, the business server queries for a user permission from the database server.

In step 16, the database server sends the permission list to the business server.

In step 17, the business server returns the user permission to the gateway.

In step 18, the gateway generates a user Token (carrying a user identification) based on the user permission.

In step 19, the gateway instructs the browser to skip to a home page.

In step 20, the user selects device information to be viewed in the browser.

In step 21, the browser sends a request carrying the user Token to the gateway.

In step 22, the gateway verifies whether the user Token is legal.

In step 23, the gateway generates a tenant identification based on the user Token.

In step 24, the gateway requests the business server to query for the device information based on the tenant identification.

In step 25, the business server requests the database server to query for the device information in a device information table.

In step 26, the database server sends the queried device information to the business server.

In step 27, the business server sends the device information to the gateway.

In step 28, the gateway instructs the browser to skip to a device details page to display the device information.

Figure 13:
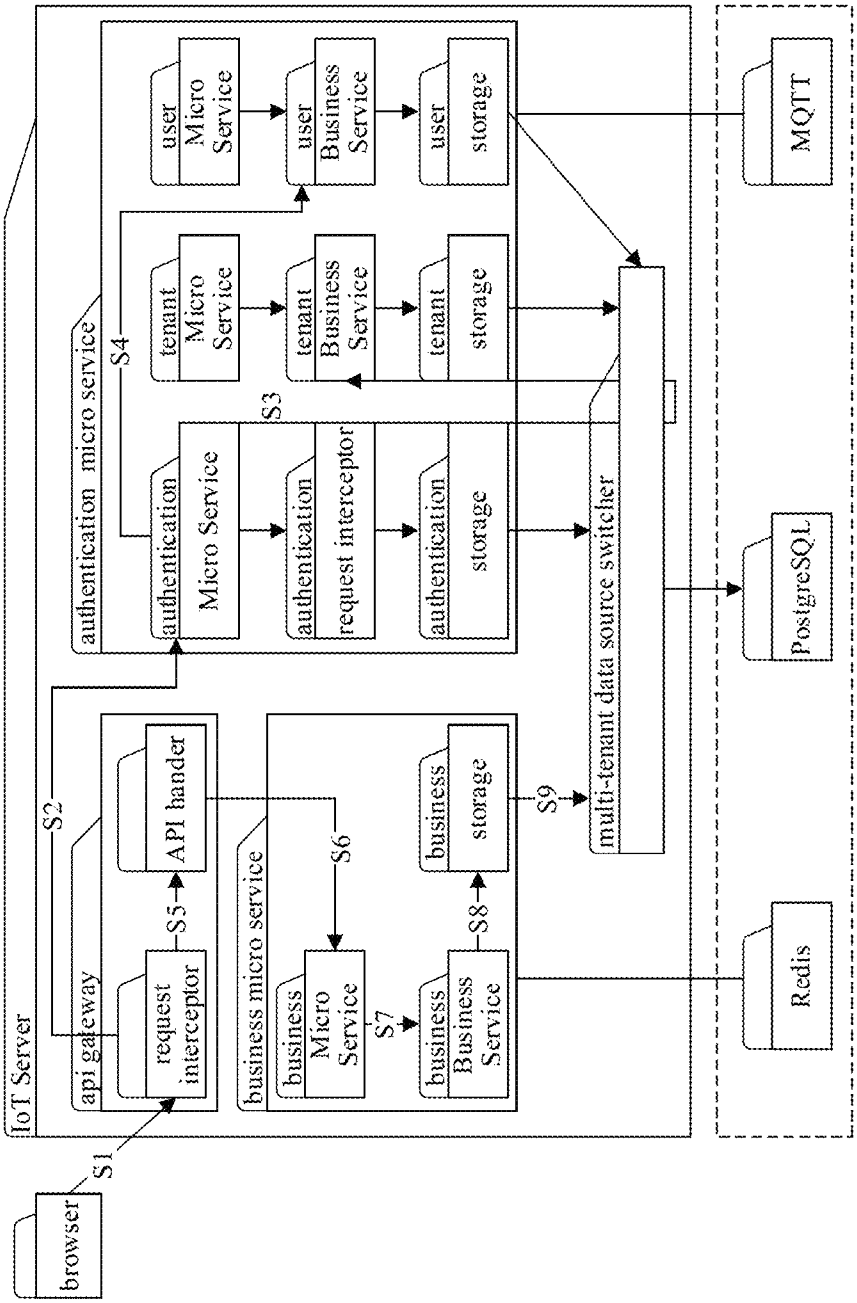
FIG. 13 schematically shows a schematic logic diagram of a permission authentication method provided in some embodiments of the disclosure.

With reference to FIG. 13, a main workflow for modifying the tenant data is as follows.

In S1, a client requests IoT service through a gateway, and the request is intercepted by an interceptor.

In S2, the request interceptor invokes an authentication and permission authentication service.

In S3, the authentication and permission authentication service performs tenant identification and tenant authentication, and if the authentication passes, the tenant identification is added to a request context.

In S4, the authentication and permission authentication service performs user authentication and user permission authentication.

In S5, after successful authentication and permission authentication, the request interceptor carries a tenant context and forwards the request to a gateway API processor.

In S6, the gateway API processor carries the tenant context to request a business server:

In S7, the business server requests a business server based on the tenant context.

In S8, the business server invokes a functional interface of a multi-tenant data source switcher.

In S9, the multi-tenant data source switcher queries or modifies the tenant data.

A Remote Dictionary Server (Redis) is an open-source, network-enabled, memory-based, persistent log-based, Key-Value database written in an American National Standards Institute C (ANSI C) language, and provides APIs in a plurality of languages. PostgreSQL is a full-featured, free-software, object-relational database management system. Message Queuing Telemetry Transport (MQTT) is a messaging protocol based on a publish/subscription paradigm under an International Standard Organization (ISO) standard (ISO/IEC PRF 20922). It works on a Transmission Control Protocol/Internet Protocol (TCP/IP) family and is a publish/subscription messaging protocol designed for remote devices with poor hardware performances and poor network conditions.

Figure 14:
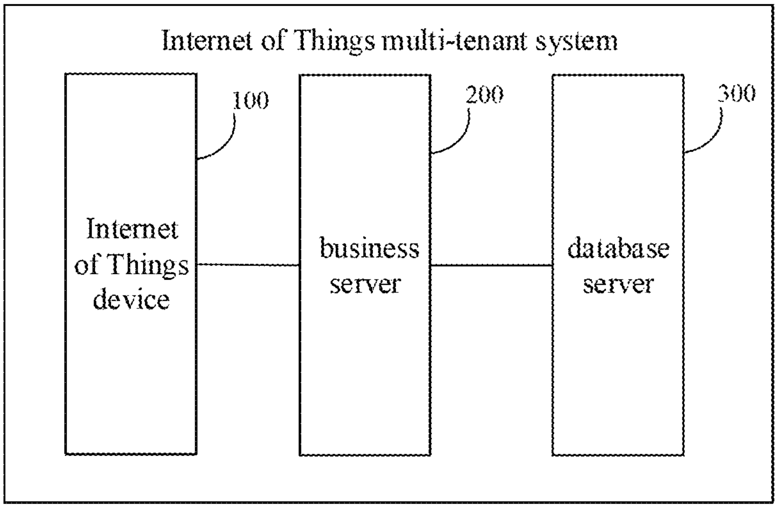
FIG. 14 schematically shows a schematic structural diagram of an Internet of Things multi-tenant system provided in some embodiments of the disclosure.

FIG. 14 schematically shows a schematic structural diagram of an Internet of Things multi-tenant system provided in the disclosure. The system includes an Internet of Things device 100, a business server 200 and a database server 300.

The business server 200 is a server for providing logic computation, service data support, and other functions provided by the Internet of Things device 100. It can be understood that due to the limited computation and storage capacities which can be provided by the Internet of Things device 100, the data processing and data storage pressures of the Internet of Things device 100 can be reduced by externally connecting to the business server 200, of course, connecting the business server 200 through the Internet of Things device 100.

The Internet of Things device 100 is configured to send an account creation request to the database server 300 in response to user input. The account creation request includes: an account identification, a database instance identification and a business identification.

The database server 300 is configured to create a target tenant database corresponding to the account identification in the database server 300 based on a database instance corresponding to the database instance identification. The database instance is a database instance corresponding to an existing tenant database in the database server 300. After the target tenant database is created, the database server 300 sends a database creation success notification corresponding to the account identification to the Internet of Things device 100 and the business server 200.

The business server 200 is configured to create a data source corresponding to the account identification based on the database creation success notification, and send the data source identification of the data source to the IoT device 100.

The Internet of Things device 100 is configured to establish a mapping relationship between the data source corresponding to the data source identification and the account identification, so as to establish a connection pool between the target tenant database and the data source.

Optionally, the Internet of Things device 100 is further configured to obtain an operation parameter of the connection pool, adjust a configuration parameter of the connection pool based on the operation parameter of the connection pool, and send a connection pool adjustment notification carrying the configuration parameter of the connection pool to the business server 200. The business server 200 performs at least one of following parameter configurations of the connection pool:

when a number of connections is greater than the maximum number of connections, a number of connections in excess of the maximum number of connections are released;

when a number of idle connections is greater than the maximum number of idle connections, a number of idle connections in excess of the maximum number of idle connections are released; and when the number of idle connections is smaller than the minimum number of idle connections, a number of connections below the minimum number of idle connections are created.

Optionally, the Internet of Things device 100 is further configured to generate an account key and a business key corresponding to the account identification, and send the account key and the business key to the business server 200 corresponding to the business identification to complete a service registration process of the account. The account key and the business key are configured to verify an identity of the account.

The business server 200 is further configured to store the account key and the business key in association.

Optionally, the Internet of Things device 100 is further configured to generate a first account signature based on the account key and the business key in response to user input, and send a service acquisition request carrying the account key and the first account signature to the business server 200.

The business server 200 is further configured to query for the business key associated with the account key, and generate a second account signature based on the business key and the account key. The business server 200 sends business service information to the Internet of Things device 100 when the first account signature and the second account signature are successfully compared.

Optionally, the Internet of Things device 100 is further configured to send an account verification request carrying the account identification to the business server 200 in response to the received device information query operation.

The business server 200 is further configured to query the database server 300 for account information corresponding to the account identification in response to the account verification request. After verification for the account information passes, the business server 200 sends an authentication pass message for the account identification to the Internet of Things device 100.

The Internet of Things device 100 is further configured to obtain device information matching an account permission of the account identification from the database server 300 in response to the authentication pass message, and display the device information.

Figure 15:
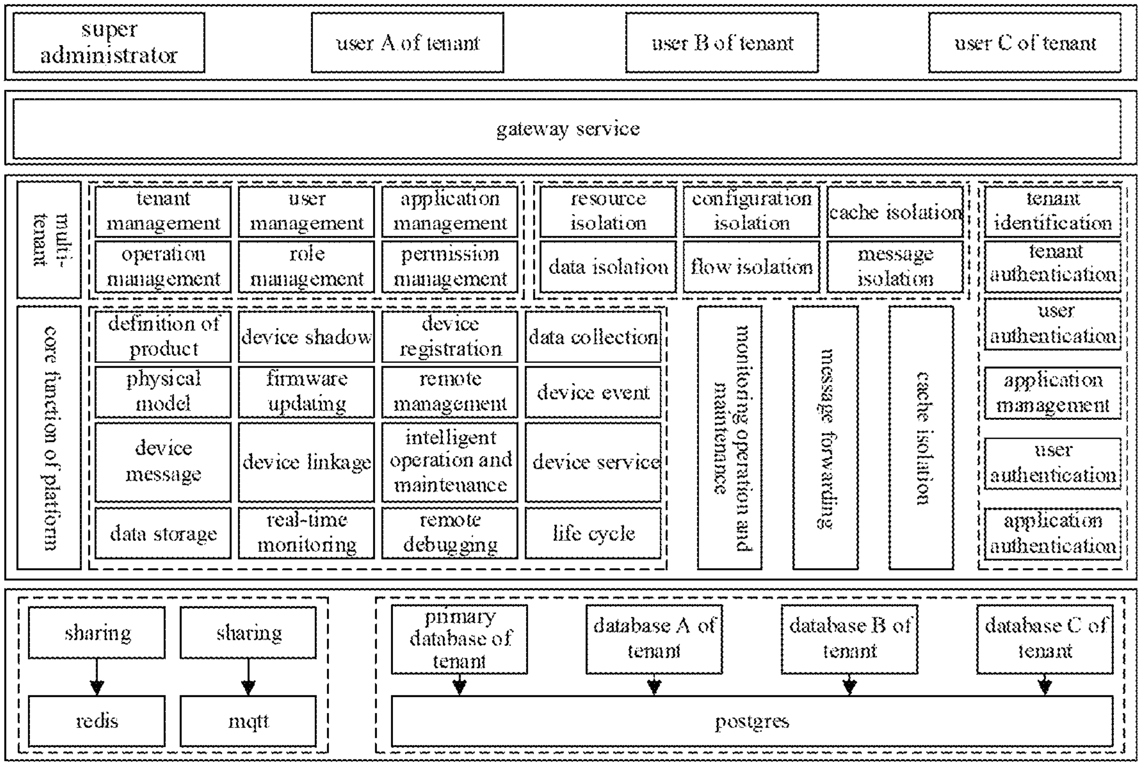
FIG. 15 schematically shows a schematic architecture diagram of an Internet of Things multi-tenant system provided in some embodiments of the disclosure.

With reference to FIG. 15, functional modules in the Internet of Things multi-tenant system in some embodiments of the disclosure function as follows:

an operation management module for operation management which is responsible for managing and maintaining a database instance and creating a tenant database in the database instance;

a tenant management module for tenant management which can support the creation and management of tenants in the platform.

an authentication center module which is configured to set a role, assign a function permission to the role, and then assign the role to a user, so that the user has the permission owned by the role, and when the permission modification is required, it is only necessary to modify the permission of the role.

An application management module is configured to create and manage third-party applications, and manage application permissions, wherein the applications can only access a platform Application Programming Interface (API) which has been authorized.

A data isolation module is configured to ensure that the users can only see data owned by the tenants and cannot see data of other tenants.

The authentication center module includes a tenant identification module which is configured to identify which tenant authentication module the users belong to verify the legitimacy of the tenants; perform user authentication to verify the legitimacy of the users; perform user permission authentication to verify the user permissions: perform application authentication to verify the legitimacy of the applications; and perform application permission authentication to verify the application permissions.

Figure 16:
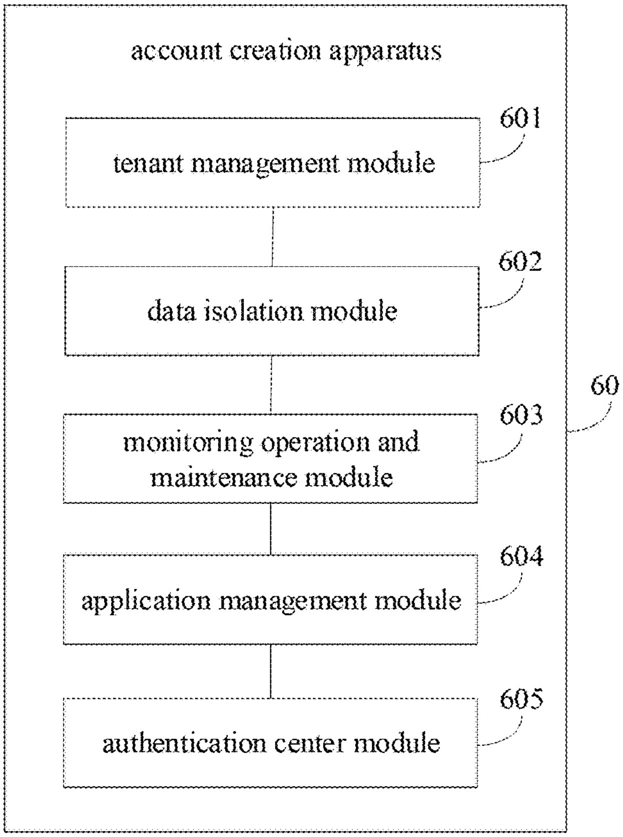
FIG. 16 schematically shows a schematic structural diagram of an account creation apparatus provided in some embodiments of the disclosure.

FIG. 16 schematically shows a schematic structural diagram of an account creation apparatus 60 provided in the disclosure. The account creation apparatus 60 is applied an Internet of Things device in an Internet of Things multi-tenant platform. The account creation apparatus 60 includes:

a tenant management module 601 configured to receive an account creation request which at least includes an account identification and a database instance identification;

a data isolation module 602 configured to create a target tenant database corresponding to the account identification in a database server based on a database instance corresponding to the database instance identification, where the database instance is a database instance corresponding to an existing tenant database in the database server; and a tenant management module 601 further configured to output an account creation success notification corresponding to the account identification after the target tenant database is created.

Optionally, the account creation request further includes a business identification associated with the account identification.

The data isolation module 602 is further configured to:

send an account creation success notification corresponding to the account identification to a business server corresponding to the business identification;

receive a data source identification sent by the business server based on the account creation success notification; and establish a mapping relationship between a data source corresponding to the data source identification and the account identification, where the data source is configured to provide business service data to the account.

Optionally, the data isolation module 602 is further configured to:

establish a connection pool between the target tenant database and the data source.

Optionally, the apparatus further includes a monitoring operation and maintenance module 603 configured to:

obtain an operation parameter of the connection pool;

adjust a configuration parameter of the connection pool based on the operation parameter of the connection pool; and send a connection pool adjustment notification carrying the configuration parameter of the connection pool to the business server;

where the connection pool adjustment notification is configured to instruct the business server to perform at least one of following parameter configurations of the connection pool;

when a number of connections is greater than the maximum number of connections, a number of connections in excess of the maximum number of connections are released;

when a number of idle connections is greater than the maximum number of idle connections, a number of idle connections in excess of the maximum number of idle connections are released; and when the number of idle connections is smaller than the minimum number of idle connections, a number of connections below the minimum number of idle connections are created.

Optionally, the tenant management module 601 is further configured to:

store the account identification and the database instance identification in association in a primary database, where the primary database is configured to store account-related tenant information.

Optionally, the data isolation module 602 is further configured to:

create a business table corresponding to the account identification in the target tenant database; and initialize business information and permission information in the business table;

where the business table is configured to record user information corresponding to the account identification and is queried by an object described by the permission information.

Optionally, the apparatus further includes an application management module 604 configured to:

receive a service registration request sent by the account, where the service registration request at least includes a business identification and an account identification;

generate an account key and a business key corresponding to the account identification; and send the account key and the business key to the business server corresponding to the business identification to complete a service registration process of the account, where the account key and the business key are configured to verify an identity of the account.

Optionally, the apparatus further includes:

an authentication center module 605 configured to perform permission verification on tenant information, user information and application information in the Internet of Things multi-tenant platform.

In the embodiments of the disclosure, a plurality of different types of database instances are preset for use in creating a database for an account when a user creates the account, which prevents the device from restarting when a configuration is newly added for data configuration in the static file storage database, improves the efficiency of account creation and reduce the cost of operation and maintenance.

The device embodiments described above is only schematic, the units illustrated as separated parts may be or may not be separated physically, and the parts shown in unit may be or may not be a physical unit. That is, the parts may be located at one place or distributed in multiple network units. A skilled person in the art may select part or all modules therein to realize the objective of achieving the technical solution of the embodiment. Those of ordinary skill in the art can understand and implement it without creative effort.

The embodiments of each component in the present disclosure can be implemented by hardware, or by software modules running on one or more processors, or by their combination. A person skilled in the art should understand that the microprocessor or digital signal processor (DSP) can be used in practice to realize some or all functions of some or all components in the calculation and processing equipment according to the embodiments of the present disclosure the present disclosure. The present disclosure can also be implemented as the equipment or device programs (for example, computer programs and computer program products) used to execute part or all of the methods described here. The programs of implementing the present disclosure may be stored in a computer readable medium, or can have the form of one or more signals. Such signals can be downloaded from the Internet site, or provided on the carrier signal, or provided in any other form.

Figure 17:
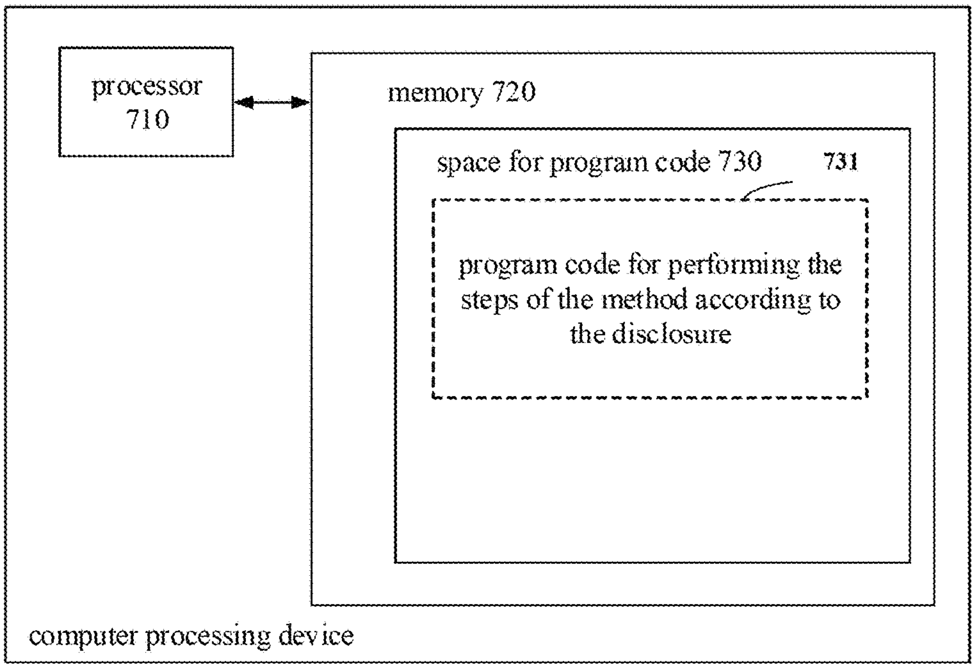
FIG. 17 schematically shows a block diagram of a computational processing device for preforming the method according to some embodiments of the disclosure.
Figure 18:
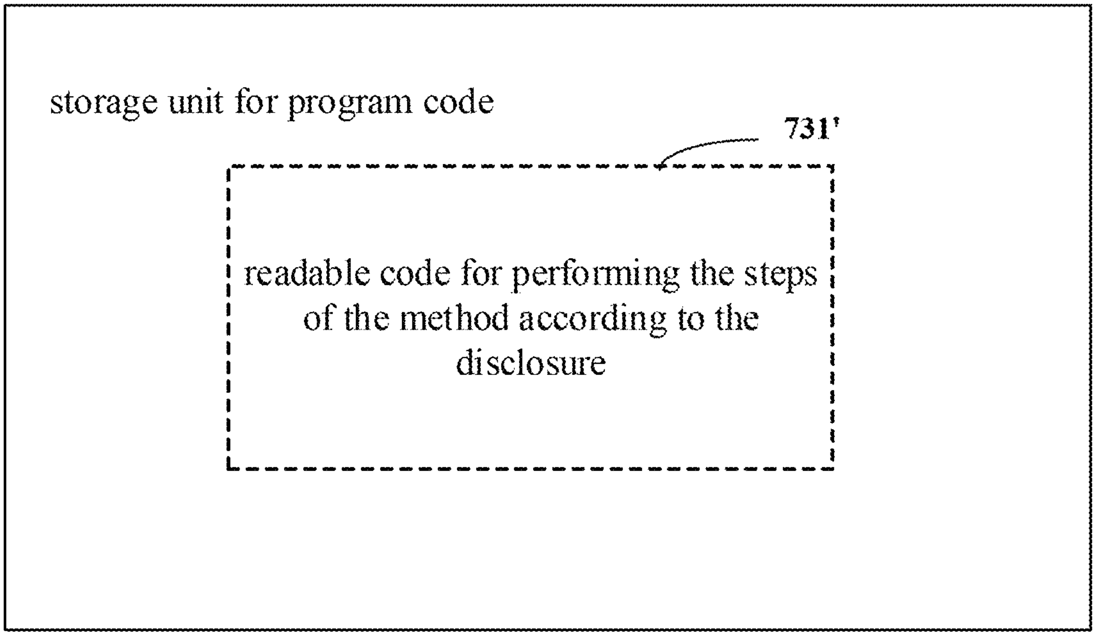
FIG. 18 schematically shows a storage unit for holding or carrying program code for implementing the method according to some embodiments of the disclosure.

For example, FIG. 17 shows a computer processing device that can implement the method according to the present disclosure. The computer processing device traditionally includes a processor 710 and a computer program product or computer-readable medium in the form of a memory 720. The memory 720 may be electronic memories such as flash memory, EEPROM (Electrically Erasable Programmable Read Only Memory), EPROM, hard disk or ROM. The memory 720 has the storage space 730 of the program code 731 for implementing any steps of the above method. For example, the storage space 730 for program code may contain program codes 731 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 18. The storage unit may have storage segments or storage spaces with similar arrangement to the memory 720 of the computer processing device in FIG. 17. The program codes may, for example, be compressed in a suitable form. Generally, the storage unit contains a computer-readable code 731', which can be read by a processor like 710. When those codes are executed by the computer processing device, the codes cause the computer processing device to implement each of the steps of the method described above.

It should be understood that although the steps in the flow chart of the figures are displayed in turn according to the instructions of the arrows, these steps are not necessarily performed in the order indicated by the arrows. Unless this article makes it clear that there are no strict order restrictions on the execution of these steps, they can be executed in other order. Moreover, at least part of the steps in the flow chart can include multiple sub-steps or multiple stages. These sub-steps or stages are not necessarily completed at the same time, but can be executed at different times. The order of execution is not necessarily sequential, but can be performed by taking turns or alternately with at least part of sub-steps of other steps or stages of other steps.

Reference to "one embodiment", "an embodiment" or "one or more embodiments" herein means that a specific feature, structure or characteristic described in connection with embodiments is included in at least one embodiment of the present disclosure. In addition, it is noted that an example of a word "in one embodiment" here do not necessarily refer to a same embodiment.

In the specification provided here, numerous specific details are set forth. However, it can be understood that the embodiments of the present disclosure can be practiced without these specific details. In some instances, wellknown methods, structures and techniques have not been shown in detail in order not to obscure understanding of this specification.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present application may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are only used to illustrate, and not to limit, the disclosed technical solution; notwithstanding the detailed description of this disclosure with reference to the foregoing embodiments, ordinary technical personnel in the field should understand that they can still modify the technical solutions recorded in the foregoing embodiments, or make equivalent substitutions to some of the technical features thereof; such modifications or substitutions shall not separate the essence of the corresponding technical solutions from the spirit and scope of the technical solutions of the disclosed embodiments.

The invention claimed is:

1. An account creation method applied to an Internet of Things multi-tenant platform, comprising:

receiving an account creation request which at least comprises an account identification and a database instance identification;

creating a target tenant database corresponding to the account identification in a database server based on a database instance corresponding to the database instance identification, wherein the database instance is a database instance corresponding to an existing tenant database in the database server; and outputting an account creation success notification corresponding to the account identification after creating the target tenant database;

wherein the account creation request further comprises a business identification associated with the account identification;

the outputting the account creation success notification corresponding to the account identification comprises:

sending the account creation success notification corresponding to the account identification to a business server corresponding to the business identification; and after the outputting the account creation success notification corresponding to the account identification, the method further comprises:

receiving a data source identification sent by the business server based on the account creation success notification; and establishing a mapping relationship between a data source corresponding to the data source identification and the account identification, wherein the data source is configured to provide business service data to an account;

wherein, after the establishing the mapping relationship between the data source corresponding to the data source identification and the account identification, the method further comprises:

establishing a connection pool between the target tenant database and the data source; and wherein, after the establishing the connection pool between the target tenant database and the data source, the method further comprises:

acquiring an operation parameter of the connection pool;

adjusting a configuration parameter of the connection pool based on the operation parameter of the connection pool; and sending a connection pool adjustment notification carrying the configuration parameter of the connection pool to the business server;

wherein the connection pool adjustment notification is configured to instruct the business server to perform at least one of the following parameter configurations of the connection pool;

when a number of connections is greater than a maximum number of connections, releasing a number of connections in excess of the maximum number of connections;

when a number of idle connections is greater than the maximum number of idle connections, releasing a number of idle connections in excess of the maximum number of idle connections; and when the number of idle connections is smaller than the minimum number of idle connections, creating a number of connections below the minimum number of idle connections.

2. The method according to claim 1, wherein after the receiving the account creation request, the method further comprises:

storing the account identification and the database instance identification in association in a primary database which is configured to store account-related tenant information.

3. The method according to claim 1, wherein after the creating the target tenant database corresponding to the account identification in the database server based on the database instance corresponding to the database instance identification, the method further comprises:

creating a business table corresponding to the account identification in the target tenant database; and initializing business information and permission information in the business table;

wherein the business table is configured to record user information corresponding to the account identification and is queried by an object described by the permission information.

4. The method according to claim 1, wherein the method further comprises:

receiving a service registration request sent by an account, wherein the service registration request at least comprises the business identification and the account identification;

generating an account key and a business key corresponding to the account identification; and sending the account key and the business key to a business server corresponding to the business identification to complete a service registration process for the account, wherein the account key and the business key are configured to verify an identity of the account.

5. An Internet of Things multi-tenant system, comprising an Internet of Things device, a business server and a database server;

wherein the Internet of Things device is configured to send an account creation request to the database server in response to user input, wherein the account creation request comprises an account identification, a database instance identification and a business identification;

the database server is configured to create a target tenant database corresponding to the account identification in the database server based on a database instance corresponding to the database instance identification, and send a database creation success notification corresponding to the account identification to the Internet of Things device and the business server after creating the target tenant database, wherein the database instance is a database instance corresponding to an existing tenant database in the database server;

the business server is configured to create a data source corresponding to the account identification based on the database creation success notification, and send a data source identification of the data source to the Internet of Things device; and the Internet of Things device is configured to establish a mapping relationship between the data source corresponding to the data source identification and the account identification, so as to establish a connection pool between the target tenant database and the data source; and wherein, after the establishing the connection pool between the target tenant database and the data source, the Internet of Things device is further configured to perform;

acquiring an operation parameter of the connection pool;

adjusting a configuration parameter of the connection pool based on the operation parameter of the connection pool; and sending a connection pool adjustment notification carrying the configuration parameter of the connection pool to the business server;

wherein the connection pool adjustment notification is configured to instruct the business server to perform at least one of the following parameter configurations of the connection pool;

when a number of connections is greater than a maximum number of connections, releasing a number of connections in excess of the maximum number of connections;

when a number of idle connections is greater than the maximum number of idle connections, releasing a number of idle connections in excess of the maximum number of idle connections; and when the number of idle connections is smaller than the minimum number of idle connections, creating a number of connections below the minimum number of idle connections.

6. The system according to claim 5, wherein the Internet of Things device is further configured to generate an account key and a business key corresponding to the account identification, and send the account key and the business key to the business server corresponding to the business identification to complete a service registration process for the account, and the account key and the business key are configured to verify an identity of the account; and the business server is further configured to store the account key and the business key in association.

7. The system according to claim 6, wherein the Internet of Things device is further configured to generate a first account signature based on the account key and the business key in response to user input, and send a service acquisition request carrying the account key and the first account signature to the business server; and the business server is further configured to query for the business key associated with the account key, and generate a second account signature based on the business key and the account key, and send business service information to the Internet of Things device when the first account signature and the second account signature are successfully compared.

8. The system according to claim 5, wherein the Internet of Things device is further configured to send an account verification request carrying the account identification to the business server in response to a received device information query operation;

the business server is further configured to query the database server for account information corresponding to the account identification in response to an account verification request, and send an authentication pass message for the account identification to the Internet of Things device after verification for the account information passes; and the Internet of Things device is further configured to acquire device information matching an account permission of the account identification from the database server in response to the authentication pass message, and display the device information.

9. A computer processing device, comprising:

a memory in which computer readable code is stored;

one or more processors which, when executing the computer readable code, causes the computer processing device to perform the account creation method according to claim 1.

10. A computer program, comprising computer-readable code which, when run on a computer processing device, causes the computer processing device to perform the account creation method according to claim 1.

11. A non-transient computer readable medium storing a computer program of the account creation method according to claim 1.

* * * * *